(12) United States Patent
Hue et al.

(10) Patent No.: US 9,321,684 B2
(45) Date of Patent: Apr. 26, 2016

(54) CEMENT CLINKER MANUFACTURING PLANT

(75) Inventors: Francois Hue, Bourgoin Jallieu (FR); Michel Pasquier, Lyons (FR); Martine Pasquier, legal representative, Lyons (FR); Philippe Lac, Chambery (FR)

(73) Assignee: VICAT, Paris la Defense (FR)

( * ) Notice: Subject to any disclaimer, the term of this patent is extended or adjusted under 35 U.S.C. 154(b) by 405 days.

(21) Appl. No.: 13/882,284

(22) PCT Filed: Oct. 27, 2011

(86) PCT No.: PCT/FR2011/052512
§ 371 (c)(1),
(2), (4) Date: Oct. 9, 2013

(87) PCT Pub. No.: WO2012/056178
PCT Pub. Date: May 3, 2012

(65) Prior Publication Data
US 2014/0065028 A1    Mar. 6, 2014

(30) Foreign Application Priority Data

Oct. 27, 2010 (FR) ..................... 10 58829

(51) Int. Cl.
*B01J 7/00* (2006.01)
*C04B 7/60* (2006.01)
(Continued)

(52) U.S. Cl.
CPC ... *C04B 7/60* (2013.01); *C04B 7/24* (2013.01); *C04B 7/28* (2013.01); *C04B 7/364* (2013.01); *C04B 7/4446* (2013.01); *C10J 3/18* (2013.01); *C10J 3/84* (2013.01); *C10K 1/003* (2013.01); *C10K 1/004* (2013.01); *F23G 5/027* (2013.01); *F27B 7/2025* (2013.01);
(Continued)

(58) Field of Classification Search
CPC ................ C10J 2300/1807; C01B 2203/0485; F23G 2201/40
See application file for complete search history.

(56) References Cited

U.S. PATENT DOCUMENTS 3,607,157 A * 9/1971 Schlinger et al. ............... 48/206
4,353,750 A * 10/1982 Quittkat ....................... 106/744
(Continued)

FOREIGN PATENT DOCUMENTS

DE 196 08 093 A1 9/1999
EP 1 728 845 A2 12/2006
(Continued)

OTHER PUBLICATIONS

Weil et al., "Hydrogen energy from coupled waste gasification and cement production—a thermochemical concept study," *International Journal of Hydrogen Energy*, 2006, vol. 31, pp. 1674-1689.
(Continued)

*Primary Examiner* — Imran Akram
(74) *Attorney, Agent, or Firm* — Oliff PLC

(57) ABSTRACT

A cement clinker manufacturing plant that includes a plant for producing purified syngas, obtained from solid waste, and process for transferring ash recovered from the ash pan of the gasifier to at least one inlet of the feedstock conversion device, which the plant includes, and/or of the furnace for the purpose of incorporating said ash into the feedstock; and a process for conveying the purified syngas to the main tuyere of the furnace and/or to at least one inlet of the feedstock conversion device.

17 Claims, 1 Drawing Sheet

(51) Int. Cl.
- *C04B 7/24* (2006.01)
- *C04B 7/28* (2006.01)
- *C04B 7/36* (2006.01)
- *C04B 7/44* (2006.01)
- *C10J 3/84* (2006.01)
- *C10K 1/00* (2006.01)
- *F27B 7/20* (2006.01)
- *F23G 5/027* (2006.01)
- *C10J 3/18* (2006.01)

(52) U.S. Cl.
CPC ............ *B01D 2257/2025* (2013.01); *B01D 2258/0233* (2013.01); *C10J 2300/0946* (2013.01); *C10J 2300/1238* (2013.01); *C10J 2300/16* (2013.01); *C10J 2300/1634* (2013.01); *Y02P 40/145* (2015.11)

(56) References Cited

U.S. PATENT DOCUMENTS

| | | | | |
|---|---|---|---|---|
| 2006/0243582 A1* | 11/2006 | Hazlebeck | | 202/96 |
| 2007/0266633 A1 | 11/2007 | Tsangaris et al. | | |
| 2010/0282131 A1 | 11/2010 | Obrist et al. | | |
| 2011/0127470 A1 | 6/2011 | Ernst et al. | | |

FOREIGN PATENT DOCUMENTS

| WO | WO 2008/011213 A2 | 1/2008 |
|---|---|---|
| WO | WO 2009/090478 A2 | 7/2009 |
| WO | WO 2010/018436 A1 | 2/2010 |
| WO | WO 2010/067223 A1 | 6/2010 |

OTHER PUBLICATIONS

Weil et al., "Gasification Systems for Biomass Utilization," *Proceedings of the 2$^{nd}$ International Conference on Humanoid, Nanotechnology, Information Technology, Communication and Control, Environment, and Management 2005*, Mar. 2005, pp. 1-7.

International Search Report issued in International Patent Application No. PCT/FR2011/052512 mailed Aug. 13, 2012.

International Preliminary Report on Patentability issued in International Patent Application No. PCT/FR2011/052512 mailed Apr. 30, 2013.

Search Report issued in French Patent Application No. 1058829 mailed Jul. 25, 2011 (with translation).

* cited by examiner

CEMENT CLINKER MANUFACTURING PLANT

The present invention relates to a cement clinker manufacturing plant.

In cement works, it is known to use solid waste as a fuel source, in particular in approaches to exploiting waste.

In order to ensure that the quality of the cement is in compliance with the standards in force, the solid waste must undergo prior operations relative to sorting, seeking a precise particle size, and homogenization, so as to meet the following requirements:
- low enough particle size,
- sufficient and stable Net Calorific Value (hereafter "NCV"). This is the heat energy released by the combustion reaction of a kilogram of fuel in the form of sensible heat, excluding vapor pressure (latent heat) from the water present at the end of the reaction.
- low sulfur and chlorine content to avoid clogging of the baking line.
- low content level in metal or mineral impurities, so as not to disrupt the flame of the cement works plant or the transport circuits due to repeated obstruction.

In fact, for solid waste to be able to be introduced in the main tuyere, it is necessary for the flame resulting from the combustion to be as powerful as possible to ensure a good clinkering and reaction in the furnace.

This requires that the solid waste be reduced to a small enough size so that:
- combustion is initiated several centimeters after said waste exits the tuyere,
- the combustion is relatively quick, so that the flame is not too long,
- the combustion is complete so as to avoid reducing combustion areas,
- the mineral impurities of said solid waste have a sufficient residence time in the furnace in contact with the material to be assimilated in the clinker, and
- above all, the heat in the clinkering area is sufficient.

For that reason, only solid waste having a size smaller than 10×10×1 mm is fully suitable for use in a cement works method. This requirement necessitates several expensive grinding steps that consume considerable energy and logistical resources.

Furthermore, the ground solid waste is generally charged with chlorine and sulfur.

However, it is commonly recognized in cement works literature that the presence of significant quantities of chlorine and sulfur in the raw material and/or fuels quickly creates bonding in the preheater or rings in the furnace. The bonds can then cause obstructions, and therefore require that the cement works plant be stopped.

It is known to limit the contribution of these minor elements, namely sulfur and chlorine, present in the solid waste using sorting steps. The sorting steps nevertheless have limitations. Additionally, it is very difficult to go below a chlorine content level of 1%.

Furthermore, the NCV of the solid waste is much lower than that of noble fuels such as coal or petroleum coke. It is further hindered by the moisture of the waste, which frequently exceeds 10%. Part of the heat consumption of the furnace is therefore dedicated to drying said waste when it is introduced into the baking line, before it begins to consume itself. Prior drying of the waste is certainly possible, but requires the placement of a dryer on the handling circuit, which is often difficult to install in existing plants and involves a substantial investment. And even with prior drying, the NCV of the solid waste is often so low that it is insufficient to produce an intense enough flame to ensure good clinkering.

Thus, although it is interesting from an ecological standpoint, the use of solid waste in the cement works field as a source of fuel is not without drawbacks, since the solid waste must undergo treatment before being introduced into the furnace, so as to comply with the aforementioned requirements concerning the particle size, NCV, and low chlorine and sulfur content. This inevitably creates costs of the solid waste then approaching those of noble fuels. The economic interest of using solid waste in the context of a cement works method then disappears.

Furthermore, in technical fields other than cement works, a gas called a synthesis gas (or "syngas") is sometimes used. This is a gaseous mixture obtained from the gasification of waste, in particular solid waste, that contains a variable quantity of carbon monoxide and hydrogen, as well as a low quantity of carbon dioxide.

It is also known to purify the syngas so as to reduce its chlorine and/or sulfur content. In this respect, document WO 2008/011213 A2 describes a device for gasifying solid waste that in particular comprises a system for extracting sulfur and a hydrochloric acid washer. The applications of the syngas obtained using the device described in this document relate to electricity production, paper production, or use as a raw material to manufacture chemical products and fuels.

However, the gasification of solid waste produces ash (also called "clinker"). This is solid residues from the gasification that are extracted at the base of the gasifier in an ash pan. This ash primarily contains mineral species such as silica, alumina, iron oxide and lime, as well as minor species such as salts and a small quantity of organic residues, also called unburned product.

Table 1 below outlines a chemical analysis of the ash generated during the gasification of solid waste.

TABLE 1 chemical analysis of the ash

| Chemical entity | Typical weight percentage |
| --- | --- |
| $SiO_2$ | 20 to 40% |
| $Al_2O_3$ | 5 to 15% |
| $Fe_2O_3$ | 1 to 3% |
| CaO | 20 to 40% |
| MgO | 1 to 3% |
| $SO_3$ | 1 to 8% |
| Unburned product (carbonaceous material) | 1 to 10% |

The ash produced at the end of the gasification of the solid waste is hardly exploitable, due to its toxicity and dangerousness (it may contain heavy volatile organic carbons), and may even be harmful. In fact, said ash must be treated (for example by maturation) before being eliminated by being buried in a controlled dump. Alternatively, the ash may be vitrified using a significant heat contribution for example provided by a plasma torch, which also creates considerable excess costs in the treatment of that ash. Yet that ash still represents 10 to 30% of the initial weight of the solid waste, which may considerably decrease the interest in gasifying solid waste.

The technical problem at the base of the present invention is to provide a plant for manufacturing a cement clinker implementing a cost-effective and non-polluting energy source, made up of solid waste, without having the drawbacks related to the use of solid waste in the cement works field outlined above.

The present invention relates to a cement clinker manufacturing plant comprising:
- a device for bringing in feedstock;
- a feedstock conversion device that includes at least one preheater;
- a furnace equipped with a main tuyere, characterized in that it also comprises:
- a plant producing syngas from solid waste that comprises:
  - a solid waste storage unit;
  - a gasifier;
  - an ash pan designed to recover the ash resulting from the gasification,
  - a first syngas purification unit that comprises a reduction reactor for reducing the chlorine content and/or a reduction reactor for reducing the sulfur content of the syngas produced in the gasifier,
- means for transferring the ash recovered in the ash pan to at least one inlet of the feedstock conversion device and/or the furnace so as to be incorporated into the feedstock;
- means for bringing in purified syngas from the purification unit to the main tuyere of the furnace and/or at least one inlet of the feedstock conversion device.

Thus, the clinker manufacturing plant according to the invention produces a fuel in the form of a purified syngas that is fully suitable for the flame resulting from its combustion to be powerful enough to ensure a good clinkering reaction in the furnace of the plant.

Furthermore, completely advantageously, the clinker manufacturing plant according to the invention does not generate waste, since the ash resulting from the gasification is then exploited by being integrated into the cement works plant according to the invention.

More specifically, using the clinker manufacturing plant according to the invention, the ash produced during gasification is exploited in several ways, due to the chemical variety of its components outlined above, i.e., due to the fact that it contains inorganic and organic components.

The ash can be exploited in the following ways:
1) by the ultimate combustion of the unburned product that contains the ash. In fact, at a temperature above 850° C. and with the oxygen present in the furnace and in some locations of the feedstock conversion device (and particularly at the precalcinator that may be included in the feedstock conversion device), this allows the complete combustion of said unburned product, which thus forms an additional heat source for the furnace.
2) by the chemical combination of the mineral species present in the ash with the components of the feedstock, owing to the long residence time of the material and the high temperature prevailing in the furnace during clinkering. In other words, the mineral species of the ash represent a non-negligible mass contribution to the clinker, which may represent approximately 4% of the total weight of the clinker manufactured with the plant according to the invention.

The clinker manufacturing plant may also comprise other technical features that are outlined below, considered alone or combined with each other. As a result, the present invention is not limited to one particular embodiment of a cement clinker manufacturing plant.

The chemical combination of the mineral species of the ash with the components of the clinker may be improved owing to grinding of the ash before it is incorporated in the feedstock, i.e., at the feedstock conversion device, and more particularly at the preheater or the precalcinator or in the furnace. That is why, advantageously, the clinker manufacturing plant according to the invention also comprises a grinder for the ash collected in the ash pan, as well as means for transferring the ash from the ash pan to the grinder and means for transferring the ground ash to at least one inlet of the feedstock conversion device and/or the furnace.

The ash transfer means are known in themselves and within the capabilities of those skilled in the art. Preferably, the ash transfer means consist of a metal bucket elevator, a metal apron conveyor, or a chain or trailing chain conveyor.

In one embodiment of the invention, the grinder is the feedstock grinder of the clinker manufacturing plant. The ash is then mixed and ground with the other components of the feedstock before being introduced into the preheater. According to this embodiment of the invention, it is recommended for the unburned product content of the ash to be as low as possible, given that the unburned product is likely to be distilled during passage in the areas with a temperature comprised between 250° C. and 700° C. of the preheater of the clinker manufacturing plant according to the invention.

Advantageously, the feedstock conversion device also includes a precalcinator and/or a smoke box.

In one embodiment of the invention, the ash pan is connected to a smoke box positioned between the precalcinator and the upstream end of the furnace. The ash directly coming from the ash pan or from the grinder can thus be transferred into the smoke box. This is particularly advantageous, since the temperature above 850° C. prevailing in the smoke box and its oxygen level contribute to the immediate and complete combustion of the unburned product present in the ash without emitting volatile organic compounds (VOC). The heat thus released by this combustion constitutes an energy contribution making it possible to decrease the heat consumption of the furnace.

Advantageously, the clinker manufacturing plant according to the invention also comprises a device for extracting and transferring gases from the preheater toward the gasifier. In this way, part of the gases with a high carbon dioxide content and low oxygen content is extracted from the preheater at more than 250° C. and, by being injected into the gasifier, favors gasification, since the carbon dioxide reacts with the carbon from the solid waste to form carbon monoxide. Preferably, the extraction and transfer device comprises at least one gas transport line on which a filter and fan are mounted. The filter makes it possible to filter the dust ventilated with the gases extracted from the preheater. This is advantageously a ceramic filter. In this way, the gases generated at the preheater can be recovered and exploited in the installation to manufacture a clinker according to the invention, due to their injection into the gasifier as well as their contribution to the gasification of the solid waste.

In another embodiment of the invention, the clinker manufacturing plant also comprises a gas transport line connecting the cooler of the furnace to the gasifier. In this way, the quaternary air (i.e., the heated air) collected at the cooler of the furnace is exploited by being injected into the gasifier. This heated air can thus also contribute to the gasification of the solid waste, having specified that the gasifier gasifies the solid waste by heating it to a temperature that may exceed 1000° C. in the presence of a limited quantity of oxygen (quantity insufficient to enable combustion of the waste). Gasification is in fact a partial oxidation method that converts the solid waste into a mixture of carbon monoxide and hydrogen by causing the solid waste to react at a high temperature with a quantity of oxygen and/or vapor.

Thus, aside from the exploitation of the ash, which is quite interesting and was explained above, the clinker manufacturing plant according to the invention also has the advantage that the gases extracted from the preheater, as well as the air heated at the cooler, are not necessarily waste, but on the contrary, may be fully exploited by contributing to the gasification of the solid waste. In other words, the clinker manufacturing plant according to the invention may be supplied by self-reducing gases necessary for the gasification of solid waste and thereby produce the fuel used in the cement works method implemented in that plant. From this perspective, the clinker manufacturing plant according to the invention operates "in a closed cycle."

Furthermore, the moisture of the solid waste mentioned above is no longer problematic, as long as it is not too high. In fact, the moisture participates in the gasification reactions and increases the NCV of the syngas produced by contributing hydrogen.

Furthermore, the residence time of the solid waste in the gasifier makes it possible to smooth the NCV variations of the solid waste, and thereby to supply the furnace with a gas with a more regular NCV, which improves the baking method of the clinker.

The gasification may be done using a gasifier in particular chosen from among counter-current or co-current fixed bed gasifiers, dense bed gasifiers, circulating fluidized bed gasifiers, rotary fluidized bed gasifiers, driven bed gasifiers, or using a two-stage pyrogasification device.

The types of gasifiers available on the market are varied enough for it to be possible to use coarsely ground solid waste. It is thus fully possible to eliminate the particle size requirements described above.

The residence time in the gasifier is the time necessary to reduce the particle size of the solids to a sufficient size to pass through the outlet grate of the gasifier and arrive in the ash. As a result, the particle size of the waste introduced into the gasifier is therefore only limited by the method of the gasifier, which is less demanding than the baking method at the main tuyere of the furnace.

With an equivalent combustible load, the flame in a furnace will have better combustion with syngas than with solid waste, even finely ground solid waste. The gasifier therefore has the advantage for the furnace of converting hard-to-burn waste into a "quasi-noble" fuel.

The gasification of the solid waste leads to the production of a syngas charged with tar. However, the condensation of the tar risks dirtying the chlorine and sulfur content production reactors and making them inoperative. That is why, optionally, the clinker manufacturing plant also comprises a plasma torch positioned between the gasifier and the syngas purification unit. In this way, the plasma torch destroys the tars present in the syngas. More specifically, this involves cracking the tars into smaller non-condensable molecules, by bringing them to a higher temperature using the plasma torch.

Preferably, the syngas production unit also comprises a flare situated downstream from the gasifier. Thus, in the case of an unplanned stop of the furnace of the clinker manufacturing plant, the gasifier continues to produce syngas for several minutes, i.e., the time necessary to completely exhaust the waste contained inside the gasifier. During that time, so as no longer to have to send syngas into the rotary furnace, the syngas is burned in the flare.

Furthermore, the flare is also useful to manage the transitional start-up and stop phases of both the gasifier and the furnace, by making it possible to adjust the syngas production to the demand from the furnace as a complement to a system for reintroducing syngas into the gasifier, with which the clinker manufacturing plant according to the invention may also be equipped.

Advantageously, the syngas production unit comprises a cooling module designed to make the temperature of the syngas leaving the gasifier compatible with the operation of the syngas purification unit.

The NCV and the syngas flow rate produced in the gasifier must meet the need of the clinker manufacturing plant according to the invention. More specifically, for an expected energy contribution, the lower the NCV of the syngas, the higher its volume. Thus, the sizing of the ducts for transporting the syngas to its injection point into the main tuyere of the furnace, as well as the sizing of the exhaust fans and the tubular sheath dedicated to the syngas, are strongly connected to its NCV.

That is why, in order to optimize the NCV of the syngas, it is advantageous for the clinker manufacturing plant according to the invention to include other technical features chosen from among the following:

means for adjusting the temperature of the air injected into the gasifier between the ambient temperature and 300° C. with a hot gas generator for the available gases coming from the furnace and as mentioned above: this may be the quaternary air coming from cooling of the furnace, or gases extracted from the preheater.

means for injecting oxygen into the air injection sheath of the gasifier, means for injecting steam into the air injection sheath of the gasifier, means for contributing noble fuel in the gasifier to obtain a carbon enrichment. Preferably, the noble fuel contribution is done in the waste supply circuit of the gasifier.

The oxygen may be introduced in a larger or smaller proportion instead of all or part of the air injected into the gasifier, thereby making it possible to produce a more rich syngas (i.e., more concentrated, as it has been partially or completely rid of nitrogen, which also only absorbs calories and dilutes the syngas). Furthermore, this makes it possible to reduce the problems caused by the low NCV of the syngas.

The noble fuel may be introduced in a larger or smaller proportion in place of all or part of the waste introduced into the gasifier, thereby making it possible to produce a syngas with a higher NCV (as it is enriched with carbon by the contribution of the noble fuel according to a chemical reaction: $C+CO_2 \rightarrow 2CO$). The noble fuel may, inter alia, be coal or petroleum coke.

The steam may be pure or diluted with the aim of increasing the NCV of the syngas according to the chemical reaction: $C+H_2O \rightarrow CO+H_2$.

Advantageously, the clinker manufacturing plant according to the invention also comprises a system for regulating the gas flow rate of the syngas, which is advantageously positioned at the outlet of the production reactor for reducing the chlorine and/or sulfur content.

These different means described above make it possible to stabilize the quantity and quality of the syngas, and thereby to limit the use at the main tuyere of the furnace or the precalcinator of a noble fuel considered to have a homogenous quality to stabilize baking in the furnace.

In the context of the present invention, a reduction of the chlorine and/or sulfur content of the syngas refers to the reduction of chlorinated and/or sulfurated compounds that may be comprised in the syngas at the outlet of the gasifier. This may in particular involve HCl and SOx.

Advantageously, the reduction reactor for reducing the chlorine content of the syngas comprises absorbents, adsorbents, zeolites or any other system known in the chemical industries (in particular refining) that is designed to reduce the chlorine content of the gas.

This may also be a washer, i.e., a reactor implementing wet washes with a lime solution or spraying an acid so as to capture the chlorine.

The production reactor for reducing the sulfur content of the syngas may consist of any suitable device known by those skilled in the art to reduce the sulfur content of a gas. Advantageously, the reduction reactor for reducing the sulfur content of the syngas consists of a washer that comprises a solution containing lime or a solution containing sodium hydroxide or a dry or semi-dry lime collection device.

Because the clinker manufacturing plant according to the invention comprises a gasifier and a syngas purification unit, one is no longer restricted by the requirements imposed on the chlorine and/or sulfur content, as well as the smallest possible particle size of the ground solid waste set out above for incorporation in a cement works method. Thus, the range of exploitable solid waste that can be used in the clinker manufacturing plant according to the invention is considerably broadened relative to the cement works plants currently operating.

The solid waste that can be used in the clinker manufacturing plant according to the invention is quite varied. It may consist of sawdust impregnated with waste, Ordinary Industrial Waste (abbreviated "OIW") such as wood, paper, cardboard, plastics, whole or shredded tires, automobile grinding residue, animal flours, refuse from sorted household waste, pyrolysis coals, bituminous shales, or polluted dirt.

Preferably, the clinker manufacturing plant according to the invention also comprises a system for injecting oxygen into the baking line of the furnace. This oxygen may be introduced into the baking line using an additional nozzle situated more or less far from the injection point of the syngas or using a nozzle introduced into a tubular sheath reserved to that effect, for example in the main tuyere or in the precalcination tuyere of the precalcinator. This has the advantage of improving the combustion conditions and decreasing the heat balance and specific ventilation energy of the baking line.

Preferably, the furnace comprised by the clinker manufacturing plant according to the invention is a rotary furnace.

In specific embodiments of the invention, the furnace may be chosen from the group consisting of wet furnaces, long dry process furnaces, semi-wet process furnaces, semi-dry process furnaces, dry process furnaces with a cyclone preheater but with no precalcinator.

The main tuyere of the furnace may be designed from the main tuyere that has been equipped, in the central portion thereof, with an additional supply channel (or in other words, an additional tubular sheath) designed to supply the flame with syngas.

In another embodiment of the invention, the main tuyere may be equipped with an additional annular channel designed to supply the flame with syngas.

The diameter of a main tuyere not being able to exceed a certain value depending on the diameter of the furnace (parameter defined by the tuyere builders), the decision to equip a main tuyere with a supply channel or an additional annular channel will depend on the diameter of the furnace, which is advantageously a rotary furnace.

In another embodiment of the invention, an additional gas tuyere can be housed more or less close to an existing main tuyere or can be placed on the main tuyere, such that the syngas circulating in that additional tuyere is oriented toward the flame, and preferably above the main tuyere.

In light of these different example embodiments of the main tuyere, it is easy to understand that the use of syngas as a fuel source in the baking line is perfectly and easily integrated into existing clinker manufacturing plants, since that use requires only an adaptation at the main tuyere, so as to create means for supplying that fuel source.

The invention will be better understood using the following non-limiting detailed description thereof, done in reference to the appended drawing, which shows two embodiments of a cement clinker manufacturing plant according to the invention:

Figure 1:
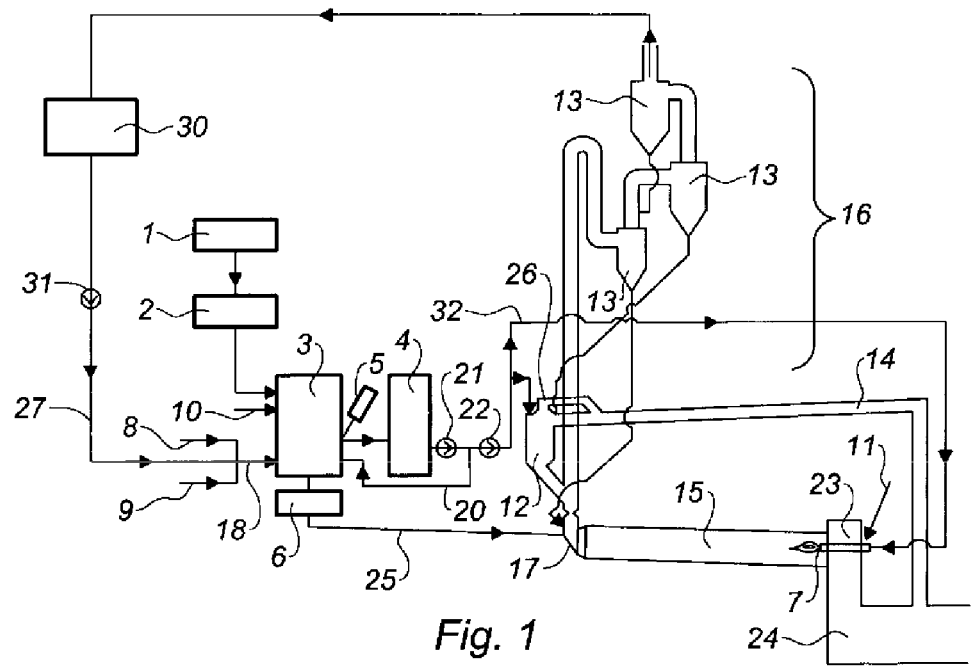
FIG. 1 shows a diagrammatic view of part of a first dry process clinker manufacturing plant with precalcination according to the invention.
Figure 2:
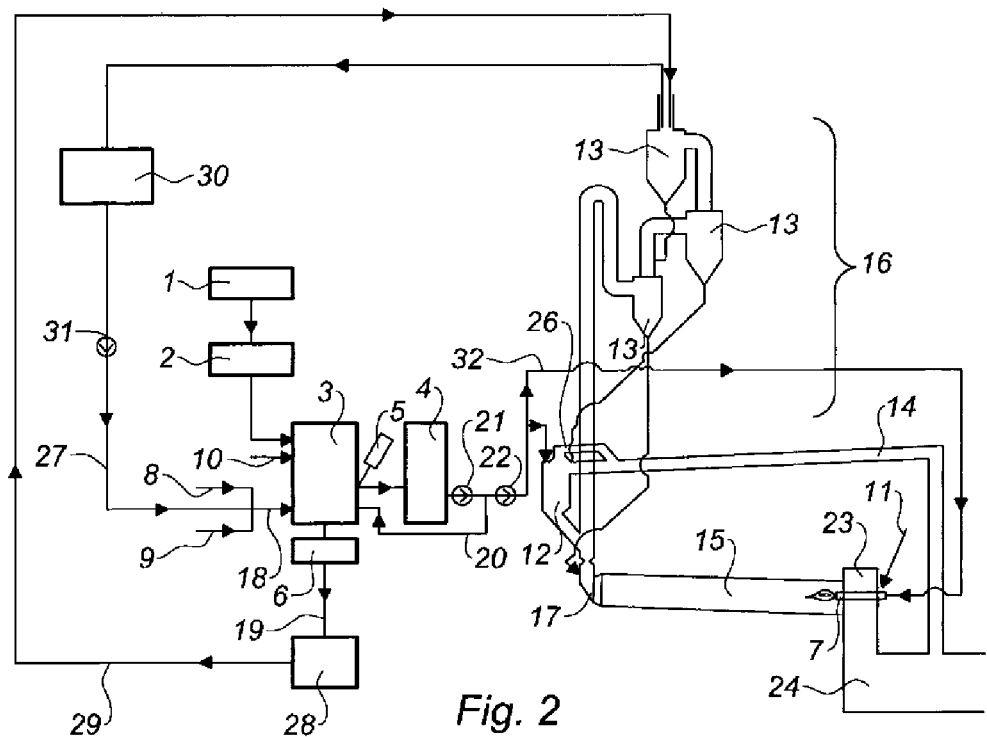
FIG. 2 shows a diagrammatic view of part of a second dry process clinker manufacturing plant with precalcination according to the invention.

In FIGS. 1 and 2, the syngas production unit comprises:
- a solid waste storage unit 1,
- a waste metering unit 2 for the waste coming from the storage unit 1,
- a gasifier 3 in which the gasification of the solid waste is done,
- a syngas purification unit 4,
- a plasma torch 5,
- an ash pan 6 designed to collect the ash obtained at the end of the gasification,
- means 8 for injecting oxygen into the air injection sheath 18 of the gasifier 3,
- means 9 for injecting steam into the air injection sheath 18 of the gasifier 3,
- means for contributing noble fuel 10 in the gasifier 3,
- means 20 for reintroducing syngas into the gasifier 3,
- a first fan 21 situated at the outlet of the syngas purification unit 4,
- a second fan 22 situated between the syngas reintroduction system 20 and the main tuyere 7.

The first fan 21 and the second fan 22 make up a regulation system for the gas flow rate of the syngas that is introduced into the main tuyere 7. In fact, the first fan 21 makes it possible to maintain a vacuum. This thereby regulates the flow rate of the syngas produced by the gasifier 3.

The syngas flow rate injected into the main tuyere 7 is regulated by the second fan 22. The excess flow rate of the gasifier between the first fan 21 and the second fan 22 is recirculated in the gasifier 3 using the syngas reintroduction system 20.

The usual cements are manufactured from a mixture of approximately 80% limestone and 20% of a material rich in silica and alumina, such as clay. Depending on the origin of the raw materials, this mixture may be corrected by adding bauxite, sand, iron ore, or other materials so as to provide the additional alumina, silica and iron oxide required. After crushing the blocks extracted from the quarry, as homogenous a mixture as possible is done with any other added components. This is a pre-homogenization phase. Then, grinding of the mixture of the raw materials is done to obtain the required fineness, followed by a homogenization step through a final agitation in a homogenizing silo (not shown). A ground feedstock, also called a flour, is then obtained.

The flour is transported from the homogenization silo to the preheater 16.

In the preheater 16, hot gases leaving the rotary furnace 15 of the cement plant gradually heat, from 60° C. to 900° C., the flour circulating in the cyclones 13 following a helical path countercurrent with respect to said hot gases by gravity. The flour, by heating above approximately 800° C., partially decarbonates, releasing carbon dioxide and water.

A device for extracting and transferring gases that comprises a gas transport line 27, on which a fan 31 and a ceramic filter 30 are mounted and which is connected to the gasifier 3, makes it possible to recover gases with a high carbon dioxide content and low oxygen content at the preheater 16 to inject them into the gasifier 3.

The syngas purified in the syngas purification unit 4 is conveyed, owing to the inlet means 32, partially toward the precalcinator 12 and partially toward the main tuyere 7 of the furnace 15.

The precalcinator 12 comprises a first tertiary air sheath 14 and a second tertiary air sheath 26 that contribute the oxygen necessary for combustion in the precalcinator 12 and enthalpy from the heat recovered at the cooler 24.

The tertiary air sheath 26 is connected to the precalcinator 12 by the upper portion of the precalcinator 12.

The heating cover 23 channels the hot air rising from the cooler 24 and coming from cooling of the clinker toward the rotary furnace 15.

In the first tertiary air sheath 14, part of the flour from the cyclones 13 of the preheater 16 is incorporated. The carbonation that began in the preheater 16 continues, at a temperature comprised between 650 and 900° C. Carbon dioxide is then released, making it possible to obtain the lime necessary to manufacture clinker.

The precalcinator 12 makes it possible to optimize the heat exchange between the flour and the hot gases, and also to obtain the quasi-complete decarbonation of the $CaCO_3$ primarily coming from the limestone.

In the smoke box 17 of the preheater 16 of FIG. 1 are:
the flour, coming from the lower cyclones 13,
the ash collected in the ash pan 6 and conveyed using the transfer means 25,
the feedstock from the precalcinator 12.

The baking occurs in the furnace 15, which is a rotary furnace at a maximum temperature of 1450° C. (with a flame temperature of approximately 2000° C.).

The rotary furnace 15 is made up of a tube with a diameter of several meters, the axis of which is slightly inclined and which rotates around itself (1 to 6 rpm). The flour advances inside the rotary furnace 15 by sliding and rolling along the inner walls covered with refractory bricks. It agglomerates at approximately 1300° C. to form nodules, following the partial fusion of its components. The lime, alumina, silica and iron oxide, contributed by the raw materials, combine with each other to form new chemical compounds participating in the mineralogical composition of the clinker (which thus constitutes an artificial rock).

Furthermore, an oxygen injection system 11 is positioned at the inlet of the main tuyere 7. This has the advantage of improving the combustion conditions and lowering the heat balance and specific ventilation energy of the baking line.

At the end of baking, the obtained clinker is cooled using the cooler 24, then ground with gypsum and, optionally, other components to form a cement.

The clinker manufacturing plant shown in FIG. 2 differs from that shown in FIG. 1 in that it comprises a feedstock grinder 28 in which the ash collected in the ash pan 6 is mixed and ground with the other components of the feedstock before they are incorporated into the preheater 16. This plant also comprises means 19 for transferring ash collected in the ash pan 6 to the feedstock grinder 28 and means 29 for transferring the ground mixture of the ash with the other components of the clinker to the preheater 16.

Of course, the present invention is not limited solely to the embodiments described above, but on the contrary encompasses all alternative embodiments within the capabilities of one skilled in the art.

The invention claimed is:

1. A cement clinker manufacturing plant comprising:
    a feedstock including at least limestone and a material that is rich in silica and alumina;
    a feedstock conversion device including at least one preheater;
    a furnace configured to heat the feedstock such that the feedstock undergoes a clinkering reaction, the furnace including a main tuyere; and
    a plant producing syngas from solid waste, the plant including:
        a solid waste storage unit,
        a gasifier configured to produce the syngas and an ash,
        an ash pan configured to recover the ash resulting from the gasification in the gasifier,
        a reduction reactor configured to reduce a chlorine content and/or a sulfur content of the syngas produced in the gasifier in order to produce a purified syngas, the purified syngas being transferred from the reduction reactor to the main tuyere of the furnace and/or at least one inlet of the feedstock conversion device, and
        an elevator or a conveyor configured to transfer the ash recovered in the ash pan to at least one inlet of the feedstock conversion device and/or the furnace so as to be incorporated into the feedstock.

2. The cement clinker manufacturing plant according to claim 1, further comprising a grinder configured to grind the ash collected in the ash pan, wherein
    the elevator or the conveyor is configured to transfer: (i) the ash from the ash pan to the grinder, and (ii) the ground ash from the grinder to at least one inlet of the feedstock conversion device and/or the furnace.

3. The cement clinker manufacturing plant according to claim 1, wherein the feedstock conversion device includes a precalcinator and/or a smoke box.

4. The cement clinker manufacturing plant according to claim 1, further comprising an extraction and transfer device configured to extract and transfer gases from the preheater toward the gasifier.

5. The cement clinker manufacturing plant according to claim 4, wherein the extraction and transfer device includes at least one gas transport line on which a filter and fan are mounted.

6. The cement clinker manufacturing plant according to claim 5, wherein the filter is a ceramic filter.

7. The cement clinker manufacturing plant according to claim 1, further comprising a gas transport line connecting a cooler of the furnace to the gasifier.

8. The cement clinker manufacturing plant according to claim 1, further comprising a plasma torch positioned between the gasifier and the syngas purification unit.

9. The cement clinker manufacturing plant according to claim 1, wherein further comprising a system configured to regulate a gas flow rate of the syngas.

10. The cement clinker manufacturing plant according to claim 1, wherein the furnace is a furnace chosen from a group consisting of: wet furnaces, long dry process furnaces, semi-wet process furnaces, semi-dry process furnaces, and dry process furnaces with a cyclone preheater but with no precalcinator.

11. The cement clinker manufacturing plant according to claim 1, wherein the gasifier is any one of counter-current or co-current fixed bed gasifiers, dense bed gasifiers, circulating fluidized bed gasifiers, rotary fluidized bed gasifiers, driven bed gasifiers, or a two-stage pyrogasification device.

12. The cement clinker manufacturing plant according to claim 1, wherein noble fuel is supplied into the gasifier.

13. The cement clinker manufacturing plant according to claim 1, further comprising an air injection sheath of the gasifier, the air injection sheath being injected with oxygen.

14. The cement clinker manufacturing plant according to claim 1, further comprising an air injection sheath of the gasifier, the air injection sheath being injected with steam.

15. The cement clinker manufacturing plant according to claim 1, wherein the reduction reactor that is configured to reduce the chlorine content of the syngas includes absorbents, adsorbents, zeolites or a washer.

16. The cement clinker manufacturing plant according to claim 1, wherein the reduction reactor configured to reduce the sulfur content of the syngas includes a washer having: (i) a solution containing lime, (ii) a solution containing sodium hydroxide, or (iii) a dry or semi-dry lime collection device.

17. The cement clinker manufacturing plant according to claim 1, wherein the feedstock includes 80% limestone and 20% of a material that is rich in silica and alumina.

\* \* \* \* \*